United States Patent

Izumi et al.

[11] Patent Number: 5,452,385
[45] Date of Patent: Sep. 19, 1995

[54] OPTICAL SCANNING DEVICE AN OPTICAL SCANNING TYPE DISPLAY AND AN IMAGE DATA INPUT/OUTPUT DEVICE

[75] Inventors: Yoshihiro Izumi, Kashihara; Sayuri Fujiwara, Nara, both of

[73] Assignee: Sharp Kabushiki Kaisha, Osaka, Japan

[21] Appl. No.: 207,653

[22] Filed: Mar. 7, 1994

[30] Foreign Application Priority Data

Mar. 9, 1993 [JP] Japan ................... 5-047661

[51] Int. Cl.⁶ ................ G02B 6/34; G01D 15/10
[52] U.S. Cl. ..................... 385/37; 385/15;
385/18; 385/129; 385/131; 385/27; 359/8;
359/30; 359/42; 359/56; 359/58; 359/82;
347/241
[58] Field of Search .......... 359/42, 56, 57, 58,
359/3, 6, 72, 82, 272, 8, 30, 34; 385/15, 16, 17,
18, 27, 24, 25, 37, 39, 129, 130, 131; 346/76 L

[56] References Cited

U.S. PATENT DOCUMENTS

| | | | |
|---|---|---|---|
| 4,006,963 | 2/1977 | Baues et al. | 385/37 X |
| 4,729,641 | 3/1988 | Matsuoka et al. | 385/37 X |
| 4,758,062 | 7/1988 | Sunagawa et al. | 385/37 X |
| 4,931,637 | 6/1990 | Succari et al. | 250/235 |
| 5,115,336 | 5/1992 | Schildkraut et al. | 359/263 |
| 5,142,394 | 8/1992 | Asada et al. | 385/37 X |
| 5,161,039 | 11/1992 | Schellenberg | 359/3 |
| 5,268,986 | 12/1993 | Ando et al. | 385/129 |
| 5,303,316 | 4/1994 | Hammer | 385/37 |
| 5,339,177 | 8/1994 | Jenkins et al. | 359/35 |

FOREIGN PATENT DOCUMENTS

| | | | |
|---|---|---|---|
| 1-224727 | 9/1989 | Japan | 385/16 X |
| 5-134151 | 5/1993 | Japan | 385/16 X |

*Primary Examiner*—Brian Healy
*Attorney, Agent, or Firm*—David G. Conlin; Kevin J. Fournier

[57] ABSTRACT

An optical scanning device comprises a light source for emitting a light, a light guide path being adapted to receive the emitted light and to transmitting the received light therein, a plurality of diffraction gratings disposed on the light guide path for taking out the transmitted light in a form of an array, and a liquid crystal shutter for scanning the taken out light in the form of the array. An optical scanning device comprises a first substrate, a second substrate, a liquid crystal layer sandwiched between the first substrate and the second substrate, a light guide path disposed on the first substrate for entering a light transmitted therein into the liquid crystal layer, a plurality of micro lenses disposed on the second substrate for converging the entered light, wherein, assuming that $n_{CORE}$ is a refraction index of a light guide medium forming the light guide path, that $n_{LCON}$ is a refraction index of a liquid crystal when an electric field is applied (on), and that $n_{LCOFF}$ is a refraction index of the liquid crystal when the electric field is not applied (off), a relation of $n_{LCON} > n_{CORE} > n_{LCOFF}$ or $n_{LCON} < n_{CORE} < n_{LCOFF}$ is satisfied.

10 Claims, 10 Drawing Sheets

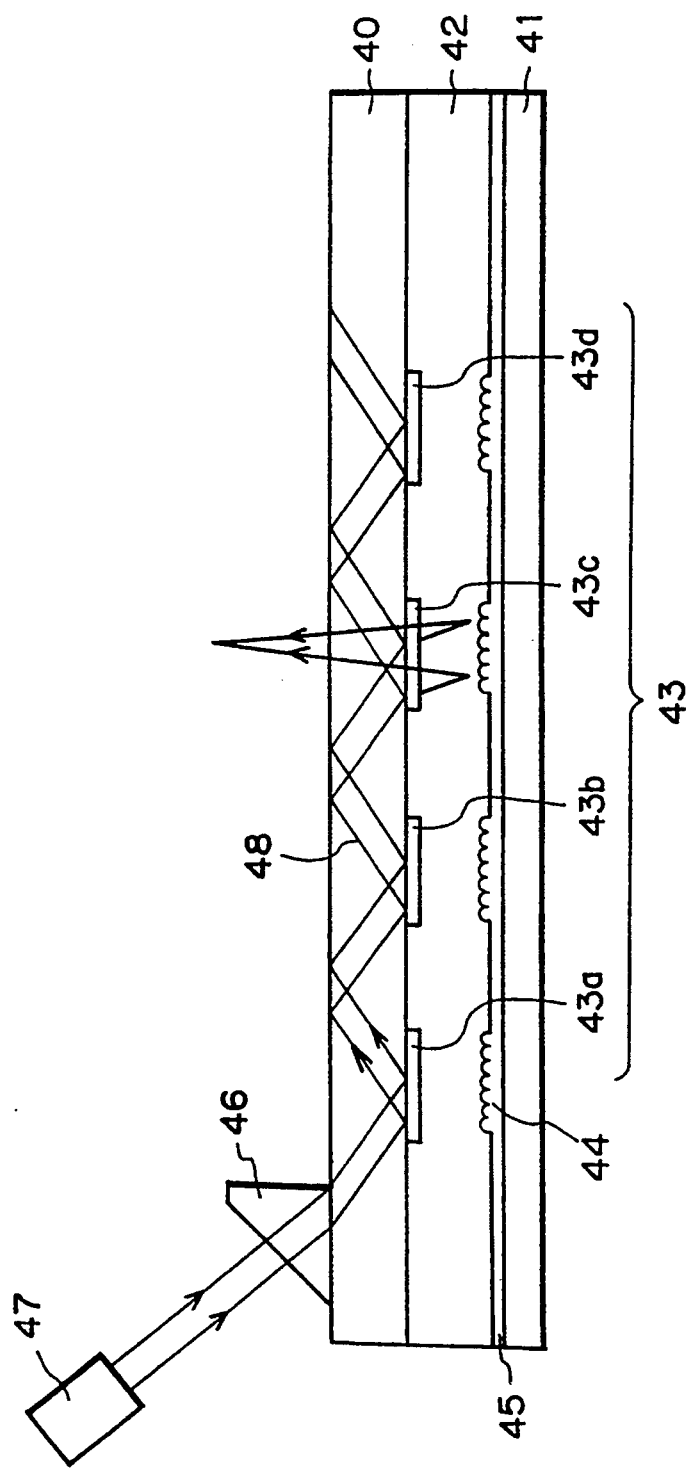

OPTICAL SCANNING DEVICE AN OPTICAL SCANNING TYPE DISPLAY AND AN IMAGE DATA INPUT/OUTPUT DEVICE

BACKGROUND OF THE INVENTION

1. Field of the Invention

The present invention relates to an optical scanning device, an optical scanning type display and an image data input/output device. Particularly, it relates to an optical scanning device which can be used as an optical scanning portion of an optical scanning type display, the scanning portion being able to be used for an AV equipment field such as a television, a game and the like, or an OA equipment field such as a personal computer, a word processor and the like, or an optical data processing field such as an optical modulation component and an optical operation component, and furthermore it relates to an optical scanning device which can be also used as an optical scanning portion of an image data input/output device of a laser beam printer and the like.

2. Description of the Related Arts

Generally, if a drive signal is transmitted through an electric wire, a transmission of a signal wave form is delayed due to a wire resistance and a floating capacitance. In order to solve this problem, it is desirable to use an optical scanning type display which uses a light as a drive signal.

A construction of a conventional optical scanning type of an active matrix liquid crystal display will be described referring FIG. 11, which display is shown in Japanese Patent Application Laying Open (KOKAI) No. 5-100248 filed by the applicant of this application.

FIG. 12 is a cross sectional view of the device seen from the line H–H' of FIG. 11.

A plurality of light guides $Y_1, Y_2, \ldots Y_n$ are arranged along a Y direction on one substrate constituting of a liquid crystal panel, and a plurality of signal electrodes $X_1, X_2, \ldots X_m$ are arranged thereon along a X direction so as to cross a plurality of the light guides. A switching component 2 comprising a photoelectric material is disposed on a crossing portion of the light guide $Y_n$ and the signal electrode $X_m$. The switching component 2 is controlled by an optical signal transmitted from an light-emitting component array 3 through the light guide $Y_n$. Then, if the light is emitted to the light switching component 2, the light switching component 2 becomes low in impedance, and the signal electrode $X_m$ and a pixel electrode 4 are connected to each other electrically. If the light is not emitted to the light switching component 2, the light switching component 2 becomes high in impedance, and the signal electrode $X_m$ and the pixel electrode 4 are insulated from each other electrically. In other words, the optical scanning type of the liquid crystal display mentioned above is driven by using the light as a scanning signal and utilize an impedance change of the optical switching component 2.

The display requires a back light such as a fluorescent lamp and the like if it is used as a transmission type display, and requires a projecting lamp such as a metal halide lamp and the like if it is used as a projecting type display, whereby a displaying can be performed by modulating the projecting light 7 within the panel. The display can be used as a reflection type display which does not require a back light by using an electrode having reflectivity as the pixel electrode 4.

As a method of scanning an optical signal, for example, there is a method of scanning the light-emitting component array 3 in turn in which semiconductor lasers (LD) or light-emitting diodes (LED) are arranged in the form of the array, as shown in the Japanese Patent Application Laying Open (KOKAI) No. 5-100246 mentioned above. In this case, as means for guiding to the light guide $Y_n$ the light signal emitted from the light-emitting component array 3, there is a lens combination system which converges the light by means of a micro lens array 5 and the like, and a direct combination system in which the light-emitting face of the light-emitting component is adhered directly to an edge face of the light guide $Y_n$, as shown in Japanese Patent Application Laying Open (KOKAI) No. 5-134151 filed by the applicant of this application.

For example, as shown in Japanese Patent Application Laying Open (KOKAI) No. 1-224727 (Cashio Computer Co.,Ltd), there is a method of forming monolithically the light guide $Y_n$ and the light-emitting component array on the same substrate. In this case, a light-emitting component of a hidrogenated amorphous silicone carbide system ($a\text{-}Si_xC_{1-x}\text{:}H$) which can be formed on glass substrate even at a relatively low temperature, is formed on an edge portion of each of the light guides.

However, there are the following problems in the optical scanning methods of the constructions mentioned above. First, there is a need to provide the LDs in the same number as the light guides, in a case where the LD is used as the light-emitting component array. A hidrogenated amorphous silicone (a-Si:H), which can be formed in a large area on a glass substrate and which has a high response speed and a superiorly optical sensibility, has been widely used as a material for a light switching component constituting of the optical scanning type display. Since the hidrogenated amorphous silicone (a-Si:H) has the high optical sensibility for a light of a wave length of nearly 600 nm, it is desirable that the light signal used in the optical scanning type display has the light of the wave length of nearly 600 nm. However, the LDs on general markets usually have light-emitting wave lengths in a near infrared area, and a LD of an Al—Ga—In—P system (a light-emitting wave length of 670 nm) is generally on the market in respect of the LD of the light-emitting wave length of nearly 600 nm, but it is still much expensive compared to the LD in the near infrared area. Furthermore, most of the short wave LDs are still under improvements. If attempts are made to form the arrays using the LDs with the light-emitting wave length of nearly 600 nm, the arrays themselves will become extremely expensive, resulting in cost increases for the entire display. Therefore, it is not desirable to use the numerous LDs of this type in the form of the array.

Then, when the LED is used as the light-emitting component array, the LED output is very small compared to the LD because of a difference of a light-emitting principle. Moreover generally, similar to the LD, as it approaches the short wave length, it becomes difficult to make large output. In order to get a large output by means of the LED, it is possible to make a light emitting area larger. However, the light of the LED is originally bad in its directivity. The larger the light-emitting area becomes, the worse the light convergence of the lens becomes. Then, an utility efficiency of the light becomes extremely bad. As a result, an extra light which is not used validly is increased, and there may be possibility to have an undesirable effect on a circumference. For example, a display performance would be deteriorated, if the extra light is made into a stray light and is emitted to the light switching component. Therefore, it is not desirable to use the LED in the light-emitting component array.

When the light guide $Y_n$ and the light-emitting component array are formed monolithically on the same substrate, the light-emitting component which can be formed on the glass substrate is only the LED which uses the amorphous material mentioned above. Now, it is difficult to form the LD on the glass substrate. Even if using a LED which is a researched (a-$Si_xC_{1-x}$:H) system, it is not sufficient in a reliability and a light-emitting strength.

SUMMARY OF THE INVENTION

In order to solve the problems mentioned above, it is therefore an object of the present invention to provide an optical scanning device in which a number of a LD used is reduced, and its cost becomes cheap and a miniaturization of the device is realized, and moreover to provide an optical scanning type display, an image data input/output device and a data processing device by using the optical scanning device.

An optical scanning device according to the present invention, comprises: a light source for emitting a light; a light guide path being adapted to receive said emitted light and to transmitting said received light therein; a plurality of diffraction gratings disposed on said light guide path for taking out said transmitted light in a form of an array; and a liquid crystal shutter for scanning said taken out light in the form of the array.

According to the optical scanning device of the present invention, it is sufficient to use a single light source, because a light emitted from a light source is divided into a plurality of light beams by means of diffraction gratings and is scanned by a liquid crystal shutter.

Furthermore, in another optical scanning device of the present invention, similarly, it is sufficient to use a single light source, because a light is scanned by controlling a refraction index difference between a light guide path and a liquid crystal. Therefore, in the optical scanning devices of the present invention, it is possible to give a cheap optical scanning device compared to a prior optical scanning device such as a LD array and the like in which light sources are arranged in the form of a plural of the arrays. And, a miniaturization is realized because a mechanical construction is not included. Furthermore, a whole device can be made cheaper and smaller, in an optical scanning type display and an image data input/output device and the like which use an optical scanning device of the present invention.

In the diffraction grating, a relief (convex/concave) type of a diffraction grating formed by using a holographic interference method or a refraction index modulation type of a diffraction grating is used.

Another optical scanning device according to the present invention, comprises: a first substrate; a second substrate; a liquid crystal layer sandwiched between said first substrate and said second substrate; a light guide path disposed on said first substrate for entering a light transmitted therein into said liquid crystal layer; a plurality of diffraction gratings disposed on said second substrate for converging said entered light, wherein assuming that $n_{CORE}$ is a refraction index of a light guide medium forming said light guide path, that $n_{LCON}$ is a refraction index of a liquid crystal when an electric field is applied (on), and that $n_{LCOFF}$ is a refraction index of said liquid crystal when said electric field is not applied (off), a relation of $n_{LCON} > n_{CORE} > n_{LCOFF}$ or $n_{LCON} < n_{CORE} < n_{LCOFF}$ is satisfied.

Still another optical scanning device according to the present invention comprises: a first substrate; a second substrate; a liquid crystal layer sandwiched between said first substrate and said second substrate; a light guide path disposed on said first substrate for entering a light transmitted therein into said liquid crystal layer; a plurality of micro lenses disposed on said second substrate for converging said entered light, wherein, assuming that $n_{CORE}$ is a refraction index of a light guide medium forming said light guide path, that $n_{LCON}$ is a refraction index of a liquid crystal when an electric field is applied (on), and that $n_{LCOFF}$ is a refraction index of said liquid crystal when said electric field is not applied (off), a relation of $n_{LCON} > n_{CORE} > n_{LCOFF}$ or $n_{LCON} < n_{CORE} < n_{LCOFF}$ is satisfied.

Further objects and advantages of the present invention will be apparent from the following description of the preferred embodiments (embodiment) of the invention as illustrated in the accompanying drawings.

BRIEF DESCRIPTION OF THE DRAWINGS

FIG. 5 is a schematic view of a fourth embodiment of an optical scanning device according to the present invention.

DESCRIPTION OF THE PREFERRED EMBODIMENTS

A first embodiment

Figure 1:
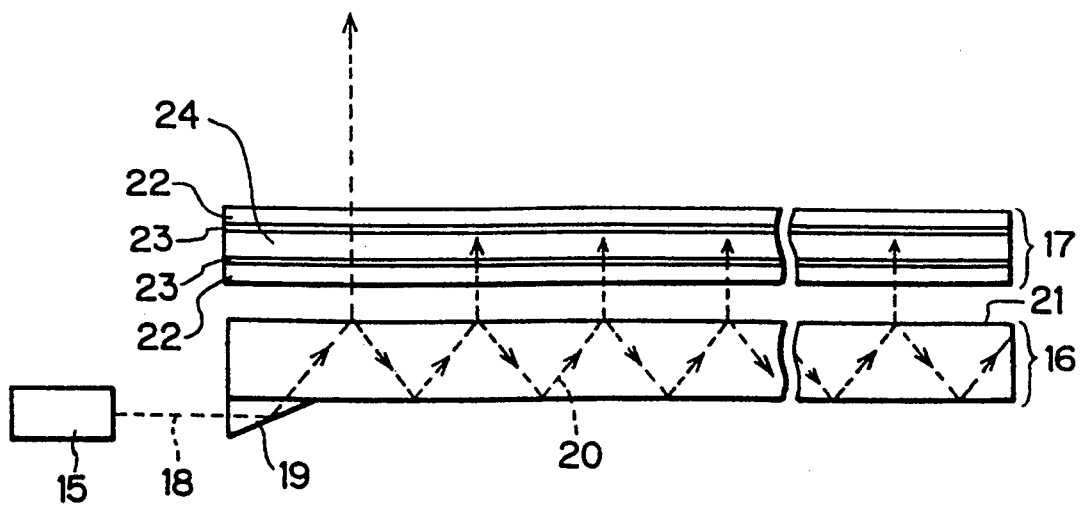
FIG. 1 is a schematic view of a first embodiment of an optical scanning device according to the present invention.

A first embodiment of the optical scanning device according to the present invention will be described hereinafter referring to FIG. 1

The first embodiment of the optical scanning device comprises a light source 15, a light guide medium 16 and a shutter 17. The light guide medium 16 is adapted to divide a light 18 from the light source 15 into a plurality of light beams in the form of the array. Essentially, the light guide medium 16 is adapted to transmit the light, and can not emit the light outside. Therefore, a light 20 transmitted within the light guide medium 16 is taken out by arranging a diffraction grating at a required place of the light guide medium 16. The shutter 17 is provided in order to transmit or cut off the light beam in the form of the array emitted from the light guide medium 16. Thereby, the light can be scanned in order.

The construction of the first embodiment of the optical scanning device will be described hereinafter. The superiorly directive material is appropriate for the light source 15. Then, it is possible to use a LD, a solid state laser, a gas laser and the like. In this embodiment, a LD of an Al—Ga—In—P system (a wave length of 670 nm) is used. A glass material having A thickness of 1 mm and a refraction index of 1.65 is used in the light guide medium 16. A light led to the light guide medium 16 by a prism 19 is perfectly reflected on a boundary surface of the light guide medium 16, because a refraction index (1.65) of the light guide medium 16 is larger than that of a circumference (1 in a case of an air), and is transmitted within the light guide medium 16. In order to take out the transmitted light from the light guide medium 16, the diffraction grating is provided on a side 21 of the light guide medium 16. The diffraction grating is a relief type (concave and convex), and is formed by a two bundles interference (a holographic) exposure and phenomenon by using a photo resist film (for example, Microposit 1300 made by Shipley Corporation and DMP-128 made by Polaroid Corporation) and by using an Ar laser ($\lambda=4880$ angstrom, 4579 angstrom and the like) and a He—Cd laser ($\lambda=4416$ angstrom, 3250 angstrom). The diffraction grating can be formed by using a photo resist mask as an etching mask and by etching materials such as glass, $Ta_2O_5$, $Nb_2O_5$, $Si_3N_4$, $SiO_2$ and the like formed on the light guide medium 16. In this case, an ion beam etching or a reactive ion etching (RIE) is superior in a controllability of a form of a groove. Such a diffraction grating diffracts the light in the light guide medium and emits the light outside, similar to a hologram pickup using a light guide path.

Figure 2:
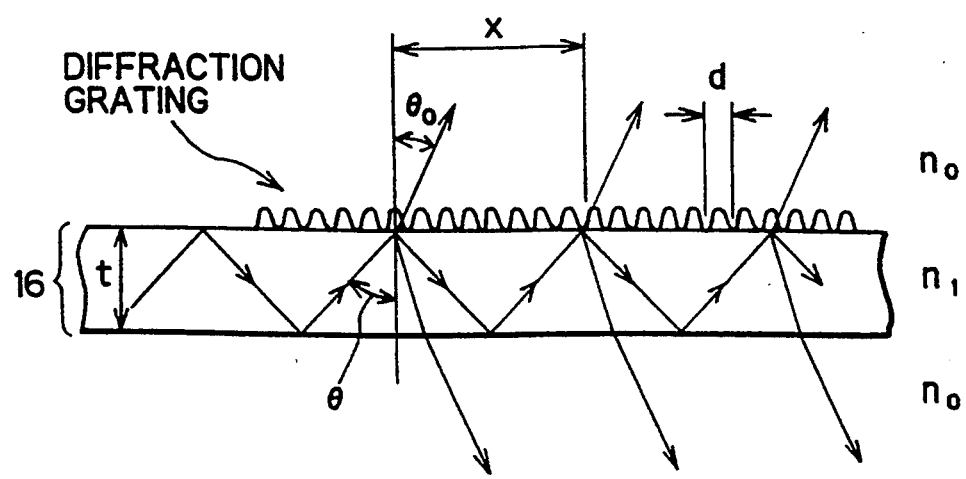
FIG. 2 is an illustrating view illustrating a principle of a diffraction grating.

A principle of the diffraction grating in which the light in the light guide medium 16 is taken out will be described hereinafter referring to FIG. 2.

The light is totally reflected at an incident angle of $\theta$ in the light guide medium 18 having a thickness of t and is transmitted therein. Assume that $n_1$ is the refraction index of the light guide medium 16, $n_0$ is the refraction index of the circumference, $\lambda$ is a wave length of the transmitted light, d is a pitch of the diffraction gratings, and $\theta_0$ is an emitting angle of a light beam emitted from the diffraction grating. Then, a relation shown in the following equation (1) is given by a principle of the diffraction between the incident angle $\theta$ and the emitting angle $\theta_0$ $$d(n_1 \sin \theta - n_0 \sin \theta_0) = m\lambda \text{ (where } m \text{ is an integer)} \quad (1)$$

In the first embodiment, it is assumed that $n_1=1.65$, $n_0=1$, $\lambda=670$ nm and $\theta=45°$. For the reason, it is possible to emit a primary (m=1) diffraction light in a direction perpendicular ($\theta_0=0°$) to a diffraction grating surface, by setting the pitch of the diffraction gratings as d=574 nm. A beam interval x at this time is indicated as $2t \tan \theta$ and then is 2 mm. The diffraction grating may be formed on the whole side of the light guide medium as shown in the drawing, or may be formed in a form of an island only in the vicinity in which the light beam is emitted. In this way, the light guide medium 16 in which the diffraction grating is formed can divide the light emitted from the one light source 15 into the light beam in a form of a parallel array.

A liquid crystal shutter is used as the shutter 17 in the first embodiment. The liquid crystal can be used as the shutter for transmitting or cutting off the light, by using an electric field control birefringence index (ECB) effect, a twist nematic (TN) effect, a phase conversion (PC) effect or a guest host (GH) effect of a nematic liquid crystal, or a switching effect of a retro-electric liquid crystal (FLC), as well known. Especially, the retro-electric liquid crystal can operate the switching in an extraordinary short time (an order of $\mu$ second) compared to the nematic liquid crystal having no spontaneous polarization, because the spontaneous polarization of the retro-electric liquid crystal directly acts directly on an electric field. Therefore, it is suitable to use the retro-electric liquid crystal when a high speed shutter is needed. The shutter 17 comprises two transparent substrates and a transparent electrode 23 and a liquid crystal 24 sandwiched between the transparent substrates 22, 22. In case of ECB, TN and FLC, the shutter 17 includes a deflecting plate. The transparent plate 23 is disposed on portions of the light guide medium 18 from which the light beams in the form of the array are emitted, and it is adapted to individually control the light beams in the form of the array. In other words, the light beam can be scanned in turn, by controlling the liquid crystal shutter.

In the optical scanning device in which the light source 15, the light guide medium 18 and the shutter 17 are combined as mentioned above, it is sufficient to use the one light source 15, because the light emitted from the light source 16 of the laser and the like is divided into a plurality of the light beams. Therefore, it is possible to provide a cheap optical scanning device compared to an optical scanning device of a LD array and the like in which a plurality of light sources are arranged in the form of the array. Moreover, the miniaturization of the device is possible because it does not have mechanical components.

A second embodiment

Figure 3:
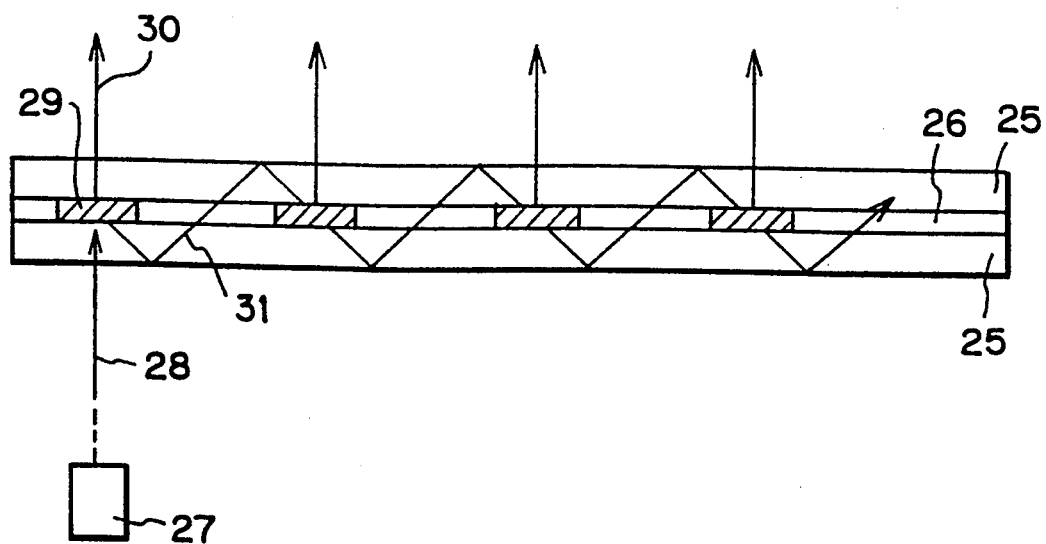
FIG. 3 is a schematic view of a second embodiment of an optical scanning device according to the present invention.

A second embodiment of the optical scanning device according to the present invention will be described hereinafter referring to FIG. 3.

The diffraction grating of the second embodiment is of a refraction index modulation type. A dichromated gelatin (DCG) film 26 is used therein. The diffraction grating is formed by means of a two bundles interference exposure by using an Ar laser.

The DCG film 26 is formed by coating a gelatin film applied on one of a glass substrates 25, 25 and dipping the coated gelatine film into an ammonium dichromate solution. When the light is emitted there, $Cr^{6+}$ ion is reduced to $Cr^{3+}$ ion, and then a difference of a refraction index is generated. In the second embodiment, the light guide medium and the diffraction grating are formed by sandwiching the DCG film 26 formed partially with diffraction gratings 29 by a pair of the glass substrates 25.

A light 28 emitted from a light source 27 is divided into a passed light 30 and a transmitted light 31 by the diffraction grating 29 partially disposed inside the DCG film 26. In the diffraction grating 29, its refraction index is modulated to a direction slant to a surface on the DCG film 26 in order to get a large diffraction efficiency. The transmitted light 31 is totally reflected on a boundary surface of the glass substrate 25, and then is transmitted to the next diffraction grating 29. Therefore, similar to the optical scanning device in the first embodiment, the light 28 emitted from the light source 27 such as the laser and the like can be divided into a plurality of light beams. Then, it is possible to provide a cheap and small optical device by combining with the liquid crystal shutter array.

A third embodiment

Figure 4:
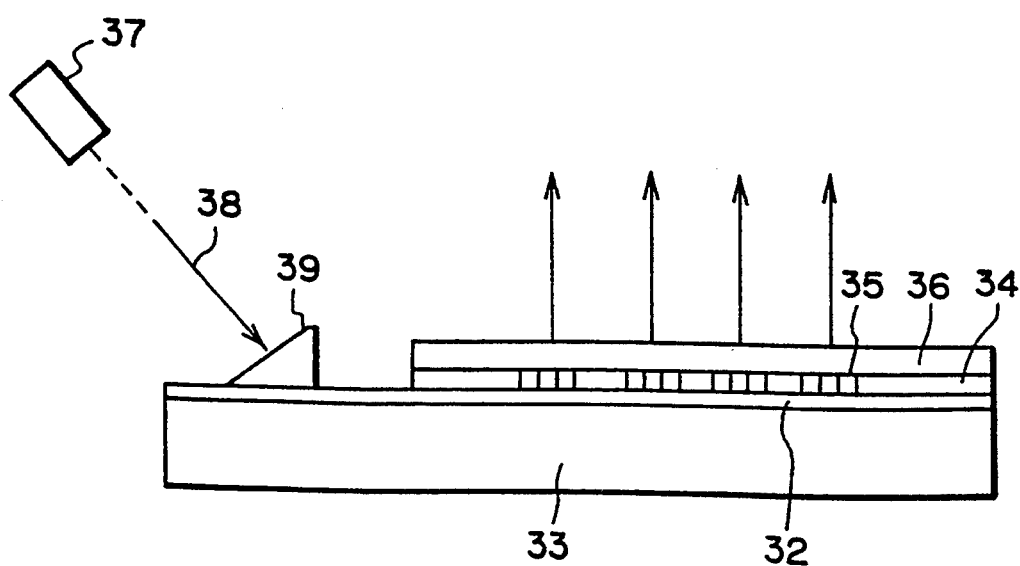
FIG. 4 is a schematic view of a third embodiment of an optical scanning device according to the present invention.

A third embodiment of the optical scanning device according to the present invention will be described hereafter referring to FIG. 4.

In the third embodiment, an ion exchange type of a glass wave guide path 32 is used as the light guide medium. The wave guide path 32 is a single mode of a slab (two dimensions) type of a wave guide path formed by exchanging $T1^+$ for $Na^+$ by diffusing the $T1^+$ inside a glass substrate 33 by means of a heat and an electric field. $K^+$ and $Ag^+$ can be diffused in addition to $T1^+$. However, it is desirable to use the $T1^+$ in order to get a large change of the refraction index. Moreover, it is possible to use any type of the wave guide path, for example, a wave guide path of $SiO_2$ system (Ge or Ti is doped in a wave guide portion) made by means of a flame hydrolysis deposition method, a CVD method or a sol-gel method, or a polymer molecular wave guide path such as PCZ, PMMA and the like in addition to the ion exchange type of the glass wave guide path 32, unless there is any problem in the transmission characteristics.

A DCG film 34 is coated on a surface of the wave guide path 32 similar to the second embodiment, and a diffraction grating 35 is formed partially therein. Moreover, a cover glass 36 is disposed thereon as a protective material.

A light 38 emitted from a light source 87 is led through a prism 39 to the wave guide path 92. The light transmitted in the wave guide path 32 can be taken out upward by the diffraction grating 35. Therefore, similar to the optical scanning device of the first embodiment, the light emitted from the light source 37 such as the laser and the like can be divided into the a plurality of light beams. Therefore, a cheap and small optical device can be obtained by combining with the liquid crystal shutter array. In this way, a thickness of the wave guide path 32 is several $\mu$ m at most. Then, its transmission characteristic is different from that of the light guide medium as shown in the first and the second embodiments in which the light is transmitted by using the perfect reflection on the boundary surface of the glass substrate. Therefore, in the third embodiment, the diffraction grating can be provided at any place on the wave guide path 32. Therefore, it is possible to make a high density optical scanning device in which a beam interval is relatively narrow.

A fourth embodiment

A fourth embodiment of the optical scanning device according to the present invention will be described hereinafter referring to FIG. 5.

The fourth embodiment comprises a light guide medium 40 made of a glass material (a refraction index n=1.49), the other substrate 41, and a liquid crystal 42 is sandwiched between the light guide medium 40 and the other substrate 41. A transparent electrodes $43a$–$43d$ are disposed partially on a boundary surface between the light guide medium 40 and the liquid crystal 42. A diffraction gratings 44 are partially disposed on positions opposite to the transparent electrodes $43a$–$43d$ on a boundary surface between the liquid crystal 42 and the substrate 41. A surface of the diffraction grating 44 is covered with a metal film 45 which acts as a reflective electrode.

A method of forming the diffraction grating 44 mentioned above will be hereinafter referring to FIGS. 6a–6d.

Figure 6A:
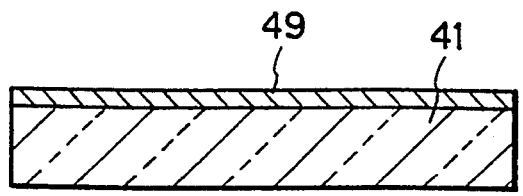
FIGS. 6a–6d are illustrating views illustrating a method of forming a diffraction grating used in the fourth embodiment of the optical scanning device.
Figure 6B:
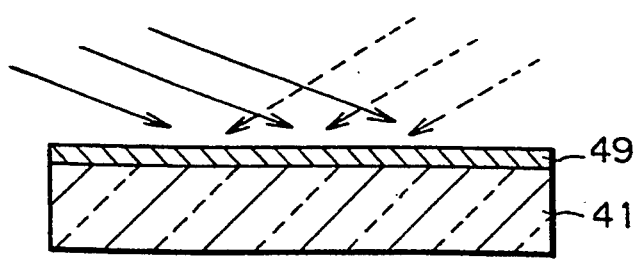
Figure 6C:
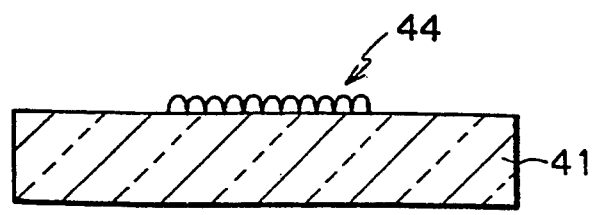
Figure 6D:
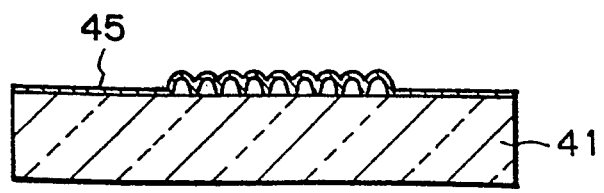

In a process (a), a photosensitive resin 49 (for example, the photo resist used in the first embodiment) is coated on the substrate 41. It is not always necessary to use a glass for a material of the substrate 41. In a process (b), a holographic exposure is applied on a portion of the resin 49 in which the diffraction grating is required (FIG. 6b). In a process (c), a development is performed. In a process (d), a reflective electrode 45 (for a example, A1 thin film) is deposited on the diffraction grating 44 comprising a photosensitive resin 49 (FIG. 6d). The diffraction grating 44 acts as a reflective type of the diffraction grating because the surface is covered with the reflective electrode 45, and acts as an electrode at the same time. Therefore, in the device as shown in FIG. 5, it is possible to apply an electric field between the transparent electrode and the metal film 45 acting as the reflective electrode disposed on the diffraction grating 44, and thereby to control the liquid crystal 42 which is sandwiched between both of the transparent electrode 43 and the metal film 45. In the fourth embodiment, a nematic liquid crystal (GB-3B made by Chisso Corporation, a refraction index $n_0=1.38$ and $n_e=1.53$) is used as the liquid crystal 42.

A scanning principle of the optical scanning device of the fourth embodiment will be described hereinafter referring FIGS. 5, & 7a–7c. A light emitted from the light source 47 is led to the light guide medium 40. A polarizing light (TM wave) in which an electric field element E is situated at an incident surface (a surface defined by an incident light beam and a normal line to the boundary surface) is used as the emitted light. At positions in which the electric field is not applied to the liquid crystal (in the fourth embodiment, at positions of $43a$, $43b$ and $43c$ in FIG. 5), a molecule of the liquid crystal exists at random because an orientation processing is not performed to the liquid crystal in the device mentioned above.

Figure 7A:
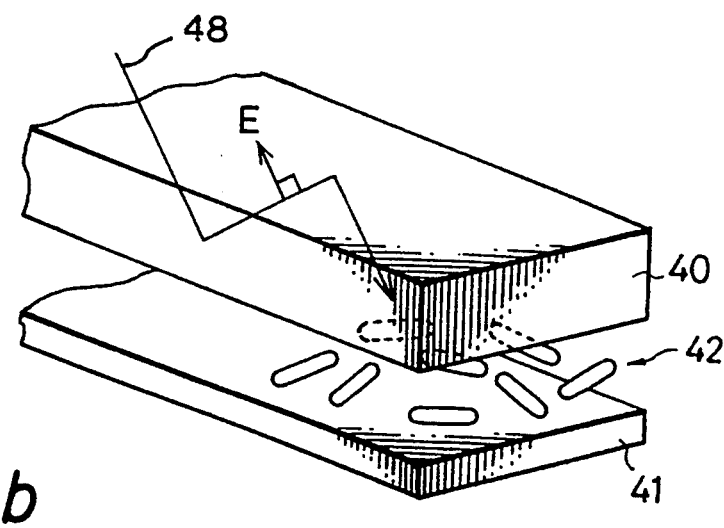
FIGS. 7a–7c are illustrating views illustrating an operating theory of a liquid crystal used in the optical scanning device as shown in FIG. 5.

A state of the molecule of the liquid crystal at this time is shown in FIG. 7a. The molecule of the liquid crystal has an average refraction index of $(n_e+n_0)/2$, that is, 1.3 for the light 48 transmitting in the light guide medium 40. Therefore, the liquid crystal 42 acts as a clad layer of the light guide medium 40, and the light 48 is reflected totally on the boundary surface between the light guide medium 40 and the liquid crystal 42, and continues to be transmitted in the light guide medium 40. On the contrary, the liquid crystal 42 is oriented along a direction of an electric field, in a position to which the electric field is applied (in the fourth embodiment, a position 43c as shown in FIG. 5).

Figure 7B:
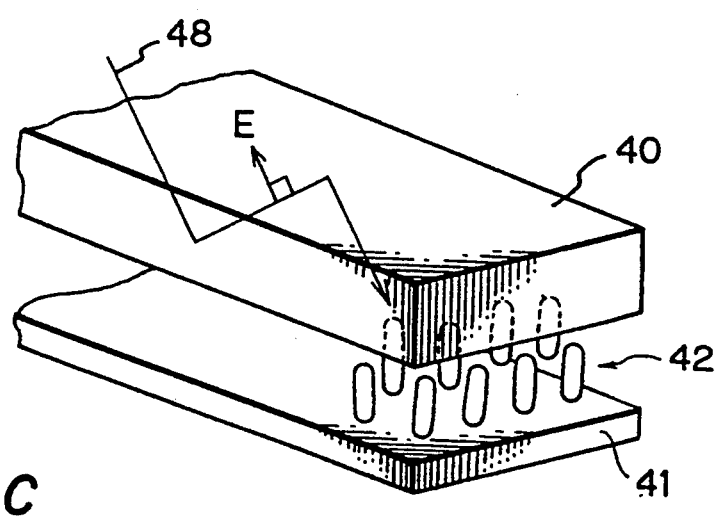

A state of the molecule of the liquid crystal at this time is shown in FIG. 7b. The molecule of the liquid crystal has a refraction index of $n_e=1.53$ for the light 48 transmitted in the light guide medium 40. Therefore, the light 48 is led to the liquid crystal 42 and reaches the diffraction grating. Then, the reflected and diffracted light can be taken out outside. In this way, in the optical scanning device of the fourth embodiment, it is possible to take out the light from any position by controlling the orientation state of the liquid crystal 42. Moreover, because the light emitted from the one light source 47 such as the laser and the like, compared to the prior art, it is possible to give a cheap and small optical scanning device. In the optical scanning devices in the first to the third embodiments, the one light beam is scanned by the liquid crystal shutter after being divided into a plurality of the light beams. However, in the fourth embodiment, because the light is supplied only at the required position, it is possible to give the optical scanning device having a higher output.

Moreover, the orientation processing may be performed for the liquid crystal 42 at this time, whereby it is possible to arrange the molecule of the liquid crystal 42 when the electric field is not applied.

Figure 7C:
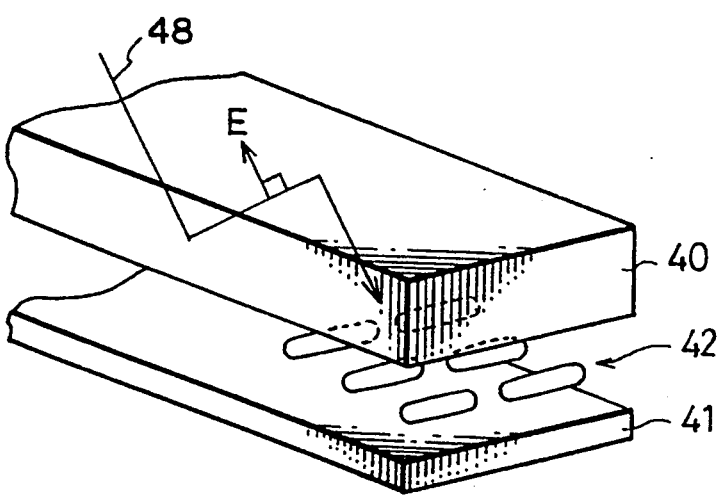

A state of the molecule of the liquid crystal at this time is shown in FIG. 7c. The molecule of the liquid crystal has the refraction index of $n_0 = 1.38$ for the light 48 transmitted in the light guide medium 40. In this case, the liquid crystal 42 also acts as the clad layer of the light guide medium 40, and it is possible to obtain the similar effect as mentioned above.

In the fourth embodiment, the glass substrate utilizing the perfect reflection of the light may be used for the light guide medium 40. However, it is possible to use any type of the wave guide path, for example, the ion exchange type of the glass wave guide path, the wave guide path of the $SiO_2$ system (Ge or Ti is doped in the wave guide portion) made by means of the flame hydrolysis deposition method, the CVD method or the sol-gel method, or the polymer wave guide path such as the PCZ, the PMMA and the like, unless there is any problem in the transmission characteristics. However, it is desirable to use a single mode of the light guide medium, in order to surely keep the deflected state in the light guide medium. Moreover, it is possible to use the various liquid crystal modes mentioned in the first embodiment in addition to the nematic liquid crystal as the used liquid crystal material. In this case, it is desirable to use the FLC when a fast optical scanning is required.

However, if using the various light guide media and the liquid crystal materials, when assuming that the $n_{CORE}$ is the refraction index of the wave guide portion of the light guide medium, and that the $n_{LCON}$ is the refraction index of the liquid crystal when the electric field is applied (on), and that the $n_{LCOFF}$ is the refraction index of the liquid crystal when the electric field is not applied (off), it is necessary to comply with the following condition. $n_{LCON} > n_{CORE} > n_{LCOFF}$ or $n_{LCON} < n_{CORE} < n_{LCOFF}$ If the transparent electrode is used instead of the reflective electrode 45, and if a transparent material is used for the substrate 41, the diffraction grating 44 generates a transmission type of a diffracted light. Therefore, the light can be emitted in the downward direction in the drawing.

A fifth embodiment

Figure 8:
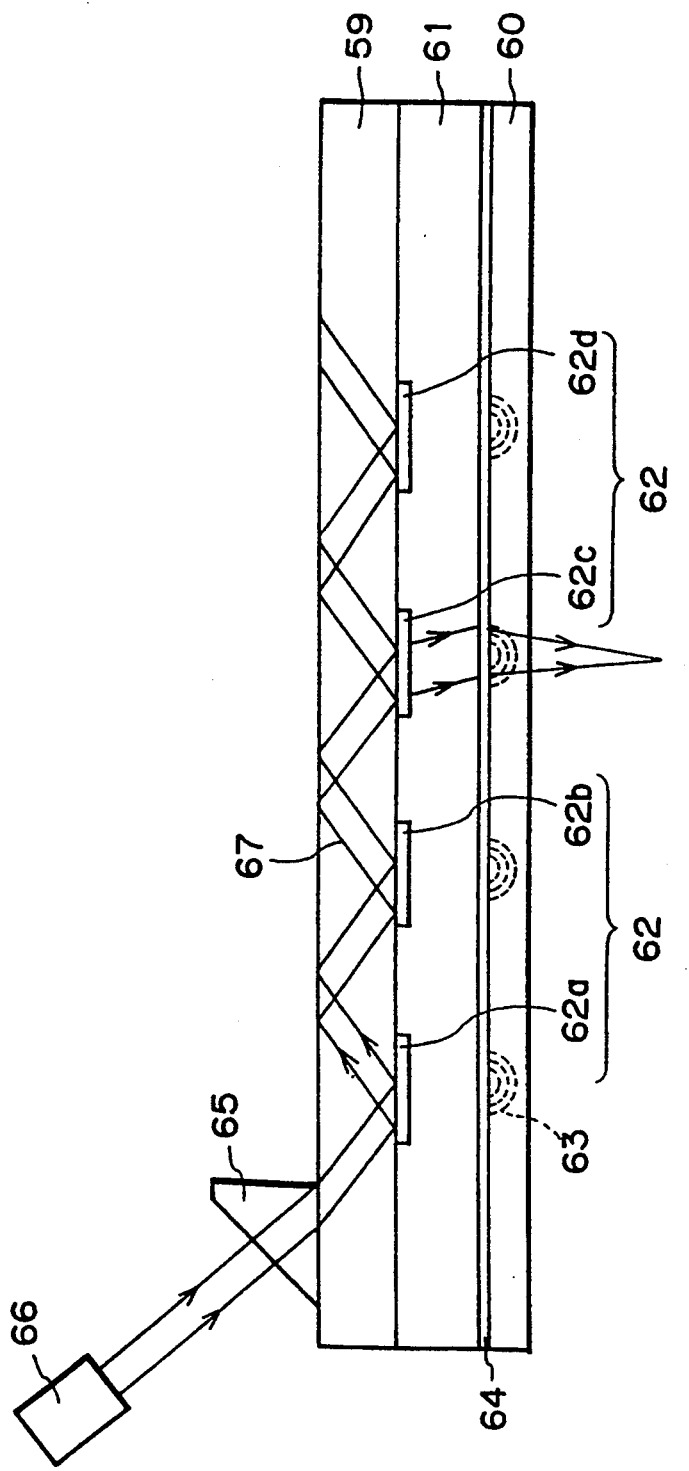
FIG. 8 is a schematic view of a fifth embodiment of the optical scanning device according to the present invention.

A fifth embodiment of the optical scanning device according to the present invention will be described hereinafter referring FIG. 8, in which fifth embodiment a micro lens is used instead of the diffraction grating 44 used in the optical scanning device of the fourth embodiment.

The fifth embodiment comprises a light guide medium 59 made of a glass material (a refraction index $n = 1.49$), the other substrate 80, and a liquid crystal 61 is sandwiched between the light guide medium 59 and the other substrate 60. A transparent electrode 62a–62d are disposed partially on a boundary surface between the light guide medium 59 and the liquid crystal 61. A transparent electrode 64 is disposed on a boundary surface between the substrate 60 and the liquid crystal 61. Moreover, micro lenses 63 are disposed at positions of the substrate 60 which are opposite to the transparent electrodes 62a–62d. The micro lens 63 is an ion exchange type micro lens made by diffusing a plus ion such as $Tl^+$ ion and the like into the glass substrate 60 and exchanging for $Na^+$ ion in the glass substrate 60. Other constructions are the same as the optical scanning device of the fourth embodiment.

An operating principle is the same as the optical scanning device of the fourth embodiment. Then, it is possible to freely lead a light 67 transmitted in the light guide medium 59 to the liquid crystal 61 based on the orientation state of the liquid crystal 61. The light reaches to the micro lens 63 and is converged there and is taken out outside. Therefore, it is possible to realize an optical scanning device having a similar effect as the fourth embodiment.

Of course, with respect to the light guide medium 59 and the liquid crystal 61, it is possible to use the various materials, similar to the fourth embodiment. Moreover, with respect to the micro lens 63, it may use a general lens (a convex lens or a concave lens) in addition to the ion exchange type micro lens.

A display embodiment

Figure 9:
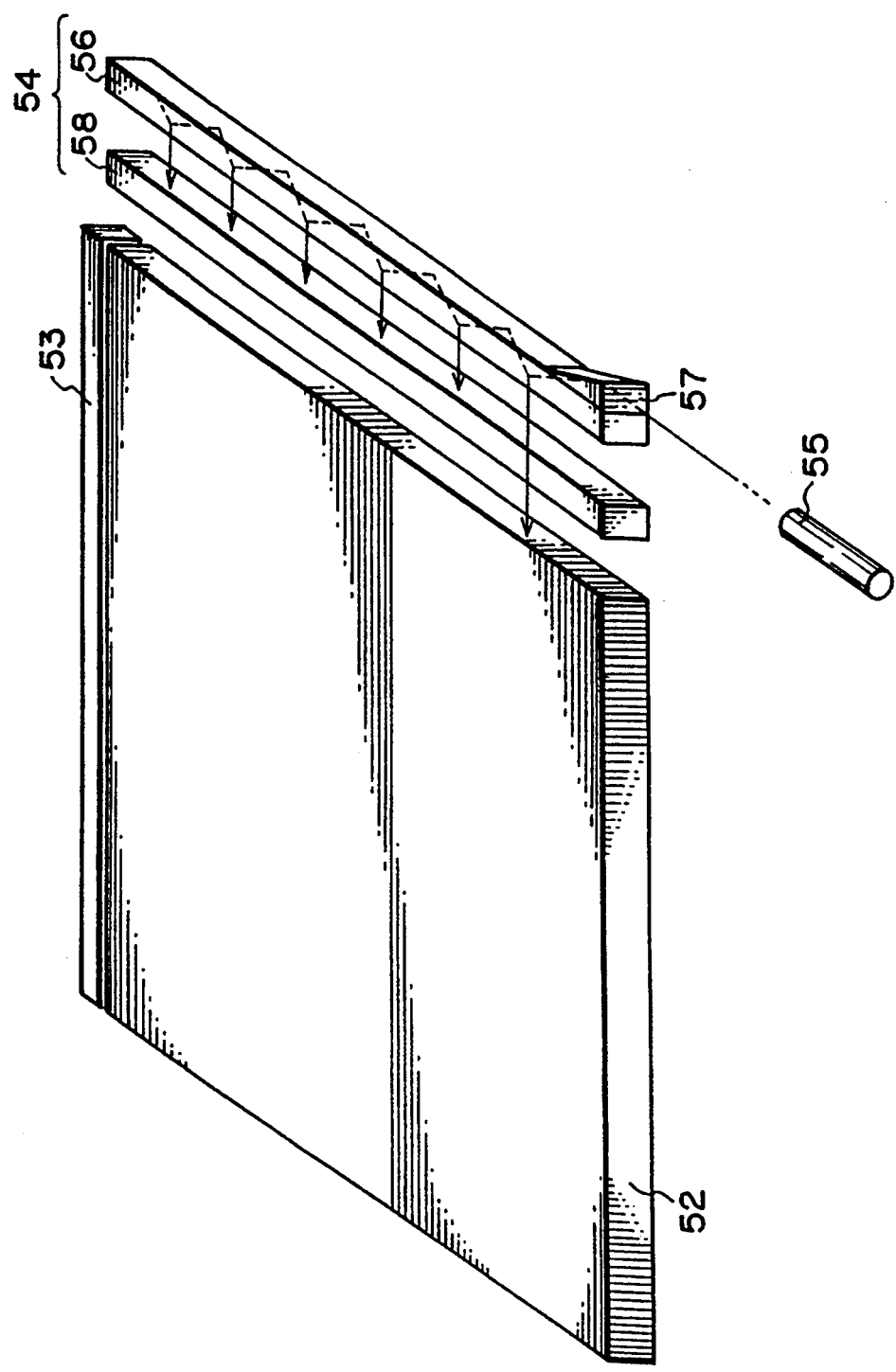
FIG. 9 is a perspective view of an optical scanning type display in which the first embodiment of the optical scanning device is adapted.

An optical scanning type display according to the present invention will be described referring to FIG. 9, to which display the optical scanning device of the first embodiment is applied.

Figure 11:
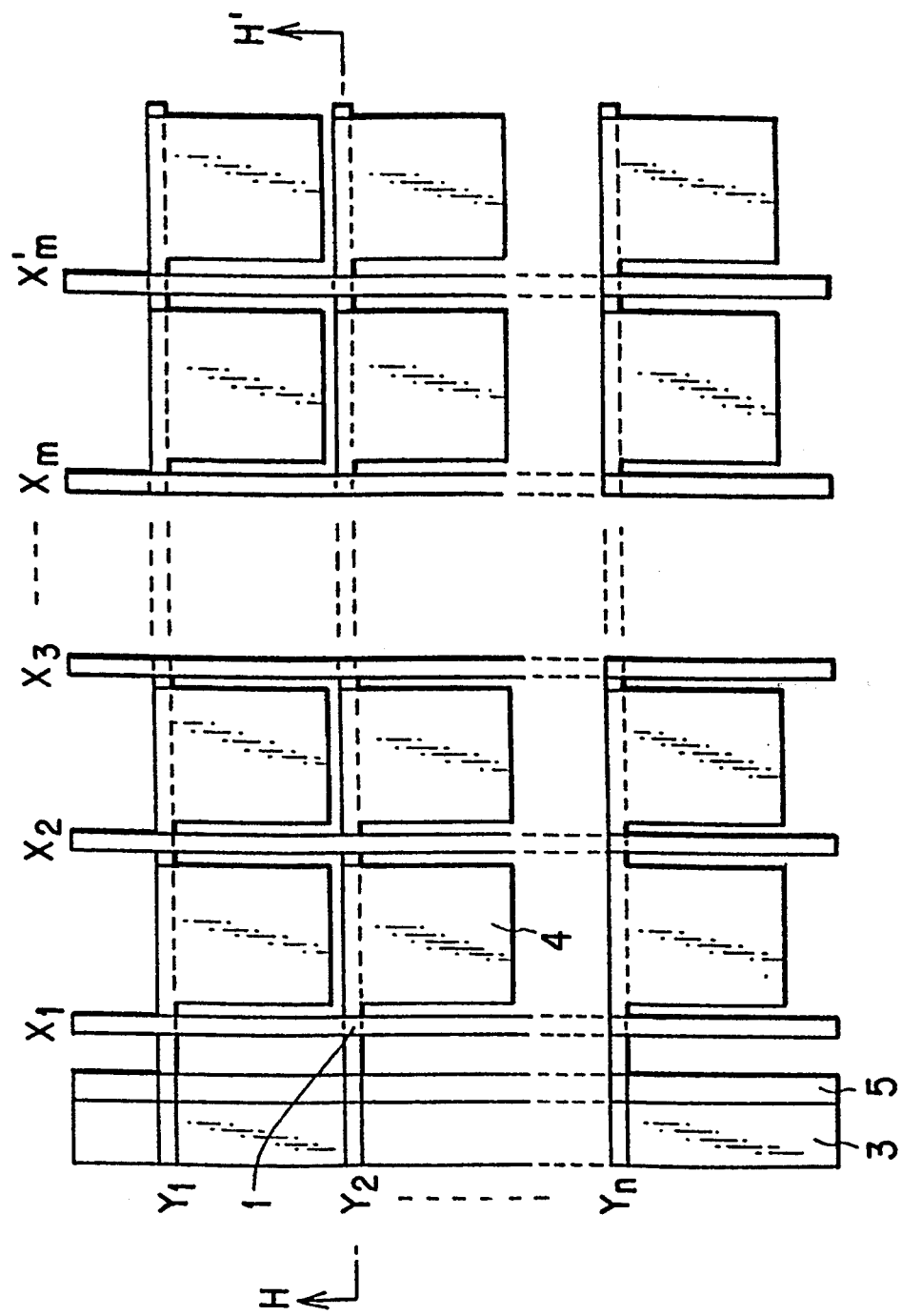
FIG. 11 is a plan view of a prior optical scanning type of an active matrix liquid crystal display.
Figure 12:
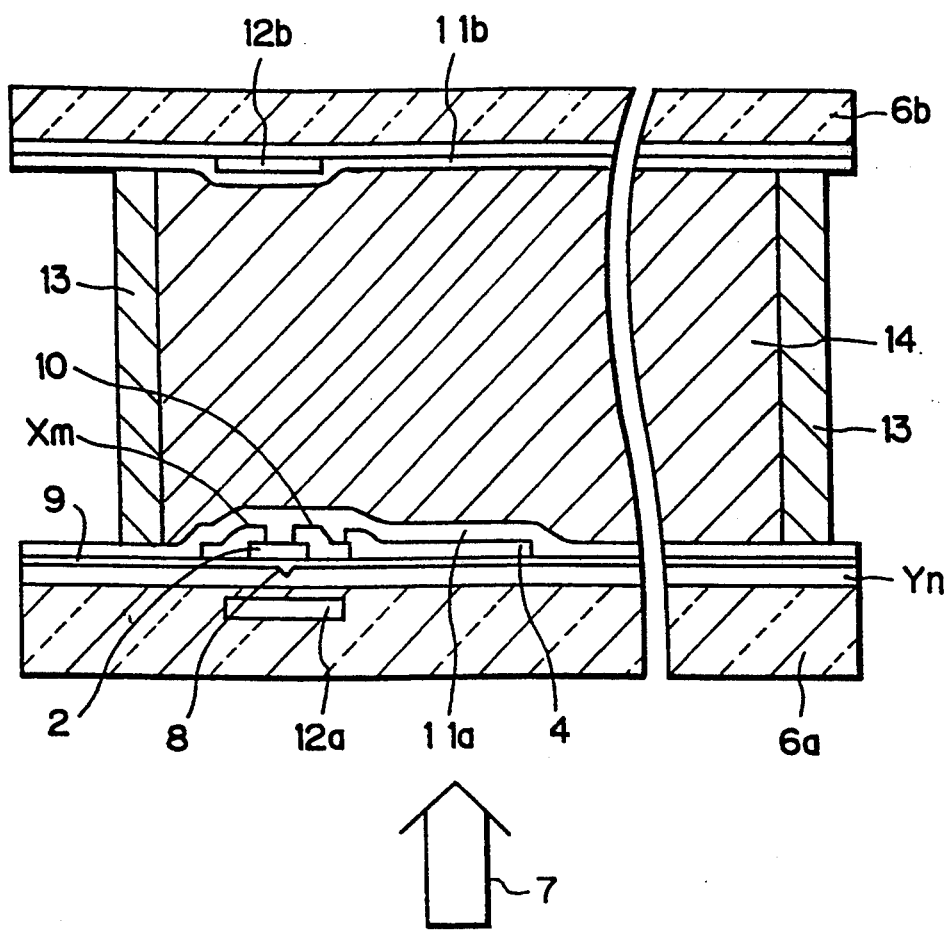
FIG. 12 is a cross sectional view of the device seen from a H–H' line of FIG. 11.

The display embodiment comprises a panel portion 52, a data signal driver LSI 53, and an optical scanning device 54. The basic construction of the panel portion 52 is the same as the prior example (FIGS. 11 & 12). Therefore, it is explained by using the same reference number. However, with respect to the light-emitting device 3 for scanning a light signal, it is omitted because the optical scanning device of the display embodiment is used instead.

Signal electrodes $X_1, X_2, X_3, \ldots, X_m$ for transmitting a data signal are arranged within the panel portion 52. each end portion of the signal electrodes $X_1, X_2, X_3, \ldots, X_m$ is connected to the data signal driver LSI 53. Also, light guide paths $Y_1, Y_2, Y_3, \ldots, Y_n$ are arranged so as to cross the signal electrodes $X_1, X_2, X_3, \ldots, X_m$. Each end portion of the light guide paths $Y_1, Y_2, Y_3, \ldots, Y_n$ is connected to an optical scanning device 54. The optical scanning device 54 comprises a light source 55, a light guide medium 56, a prism 57 and a liquid crystal shutter 58. A light beam emitted from the light guide medium 56 is scanned in turn by the liquid crystal shutter 58, and is transmitted to the light guide paths $Y_1, Y_2, Y_3, \ldots, Y_n$ within the panel portion 52. That is, it is possible to act as an active matrix display in which a scanning signal is transmitted by a light.

In the displaying embodiment, it is not required to arrange a plural of LDs in the form of the array as the optical scanning portion of the optical scanning type display, compared to the prior arts. Therefore, it is possible to give a cheap display as a whole. Moreover, because other mechanical optical scanning device is not used, a miniaturization of a peripheral equipment is possible except for a panel portion 52.

In the display embodiment, the optical scanning device as shown in the first embodiment is used especially as the optical scanning device of the optical scanning type display. However, of course, it is possible to obtain a similar effect, even if using the optical scanning device as shown in the second to fifth embodiments.

The display embodiment according to the present invention uses a TN (Twisted Nematic) made of a liquid crystal layer as an electrical optical medium used for displaying. A material of the liquid crystal is a crystal ZLI4792 of a fluorine system made by MERCK Corporation. As a liquid crystal display mode, in addition to the mode mentioned above, it is possible to use a guest host mode, an electrically controlled birefringence (ECB) mode, a super twisted nematic (STN) mode and a phase conversion mode, in which the nematic liquid crystal is used. Moreover, it is possible to use a surface stabilized ferroelectric liquid crystal (SSFLC) mode in which a chiral smectic liquid crystal is used, a polymer dispersed liquid crystal (PDLC) mode in which a composite membrane of a polymer and a liquid crystal is used and the like.

Moreover, it is possible to obtain a similar effect in other displays, for example, an electrochromic display (ECD), an electrophoretic display (EPD) and the like, in addition to the liquid crystal displays (LCDs).

A printer embodiment

Figure 10:
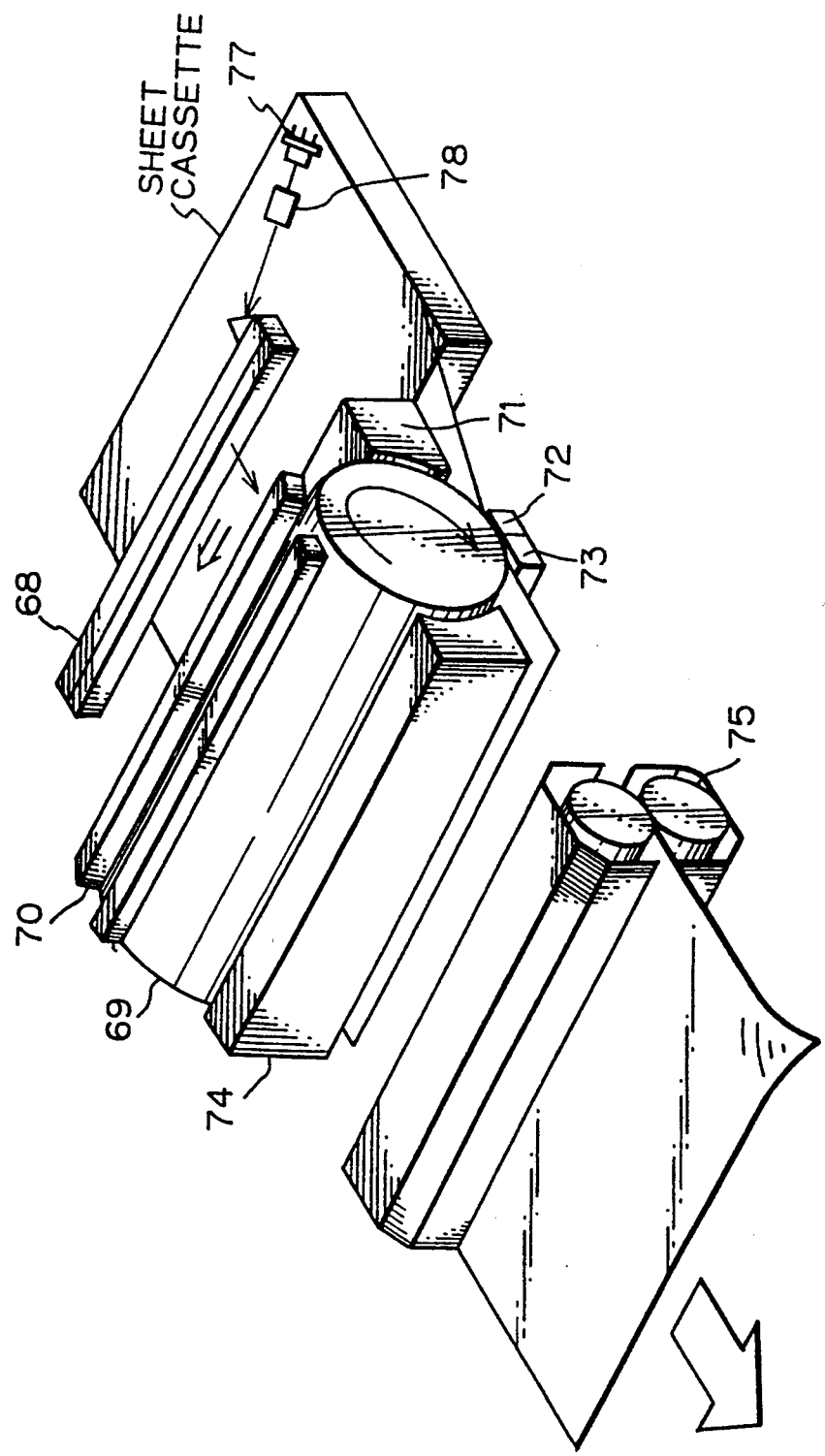
FIG. 10 is a perspective view of a laser beam printer in which the fifth embodiment of the optical scanning device.

A laser beam printer according to the present invention will be described referring to FIG. 10, to which printer the optical scanning device of the fifth embodiment is applied. The printer embodiment comprises an optical scanning device 68 (including a laser 77 and a collimeter 78), a photo sensitive drum 69, a corona charger 70, a development unit 71, a corona transfer unit 72, a corona separation unit 73, a cleaner 74 and a fixing unit 75. A construction except for the optical scanning device 68 are similar to a laser beam printer which is commercially available.

In a prior laser beam printer, a method mainly used for scanning a light emitted from a semiconductor laser by means of a rotation of a polygon mirror. In this case, it is necessary to use a mechanical construction for rotating the mirror, and a $f-\theta$ lens for directing a light reflected from the mirror in parallel. Therefore, there is a problem that a compactification of the whole optical scanning device is impossible.

In the laser beam printer according to the present invention, the device as shown in the fifth embodiment is used as the optical scanning device. Therefore, the optical scanning device is compact as a whole. As a result, the miniaturization of the laser beam printer is possible as a whole.

Furthermore, as the optical scanning device 68 used herein, it is possible to use the optical scanning device, as shown in the first to fourth embodiments. Especially, in order to obtain a high density of a scanning light, it is desirable to use an ion exchange type of a glass wave guide path with a diameter equal to or below 200 μ m, the wave guide path of the $SiO_2$ system made by means of the flame hydrolysis deposition method, the CVD method or the sol-gel method (the Ge or the Ti is doped in the wave guide portion), or the polymer wave guide path such as PCZ, PMMA and the like, and to provide the diffraction grating and the micro lens in a high density. Moreover, in view of a strength of the scanning light, the optical scanning devices as shown in the fourth and fifth embodiments are advantageous because they can obtain a higher output of the scanning light than the devices of the first to third embodiments.

Furthermore, in addition to the laser beam printer mentioned above, the optical scanning device according to the present invention can be used similarly in other image data input/output devices which require an optical scanning mechanism such as an image scanner, a facsimile, a copier and the like.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanning device comprising:
   a first substrate;
   a second substrate;
   a liquid crystal layer sandwiched between said first substrate and said second substrate;
   a light guide path disposed on said first substrate for entering a light transmitted therein into said liquid crystal layer;
   a plurality of diffraction gratings disposed on said second substrate for converging said entered light,
   wherein assuming that $n_{CORE}$ is a refraction index of a light guide medium forming said light guide path, that $n_{LCON}$ is a refraction index of a liquid crystal when an electric field is applied (on), and that $n_{LCOFF}$ is a refraction index of said liquid crystal when said electric field is not applied (off), a relation of $n_{LCON} > n_{CORE} > n_{LCOFF}$ or $n_{LCON} < n_{CORE} < n_{LCOFF}$ is satisfied.

2. An optical scanning device according to claim 1, wherein said diffraction grating comprises a relief type of a diffraction grating which is formed by means of a conductive film.

3. An optical scanning device comprising:
   a first substrate;
   a second substrate;
   a liquid crystal layer sandwiched between said first substrate and said second substrate;
   a light guide path disposed on said first substrate for entering a light transmitted therein into said liquid crystal layer;
   a plurality of micro lenses disposed on said second substrate for converging said entered light,
   wherein, assuming that $n_{CORE}$ is a refraction index of a light guide medium forming said light guide path, that $n_{LCON}$ is a refraction index of a liquid crystal when an electric field is applied (on), and that $n_{LCOFF}$ is a refraction index of said liquid crystal when said electric field is not applied (off), a relation of $n_{LCON} > n_{CORE} > n_{LCOFF}$ or $n_{LCON} < n_{CORE} < n_{LCOFF}$ is satisfied.

4. An optical scanning device comprising:
   a light source for emitting light;
   a pair of glass substrates adapted to receive the emitted light and to transmit the light therethrough;
   a dichromated gelatin film sandwiched by said pair of glass substrates and formed partially with a plurality of diffraction gratings for taking out the light in a form of an array, the refraction index of the plurality of gratings being modulated at a slant direction to a surface on the dichromated gelatin film in order to get a larger diffraction efficiency; and
   a liquid crystal shutter for scanning the light taken out in the form of an array.

5. An optical scanning device according to claim 4, wherein said liquid crystal shutter is made of a ferroelectric liquid crystal.

6. An optical scanning device comprising:

a light source for emitting light;

a wave guide path adapted to receive the emitted light and to transmit the light therethrough, said wave guide path being one selected from a group including an ion exchange type glass wave guide, an $SiO_2$ system wave guide with Ge or Ti doped in a wave guide portion and a polymer molecular type wave guide, a thickness of said wave guide path being several micrometers at most;

a dichromated gelatin film disposed on said wave guide path, formed partially with a plurality of diffraction gratings for taking out the light in a form of an array; and a liquid crystal shutter for scanning the light taken out in the form of an array.

7. An optical scanning device according to claim 6, wherein said liquid crystal shutter is made of a ferroelectric liquid crystal.

8. An optical scanning type display comprising:

a first substrate having electrodes;

a second substrate having other electrodes;

a displaying medium sandwiched between said first substrate and said second substrate;

a plurality of light guide paths disposed on said first substrate;

a plurality of signal electrodes disposed on said first substrate;

a plurality of light switching components made of a photoelectric material disposed on said first substrate said display further comprising said optical scanning device according to any one of claims 1 or 4 to 7, for driving said displaying medium by a light signal.

9. A display claimed in claim 8, wherein a displaying medium comprises a liquid crystal.

10. An image data input/output device comprising said optical scanning device according to any one of claims 1 or 4 to 7.

* * * * *